United States Patent [19]

Lewis et al.

[11] 4,430,978
[45] Feb. 14, 1984

[54] DIRECT LIQUID INJECTION OF LIQUID PETROLEUM GAS

[75] Inventors: Donald J. Lewis, Troy; Jack R. Phipps, St. Clair Shores, both of Mich.

[73] Assignee: The Bendix Corporation, Southfield, Mich.

[21] Appl. No.: 306,259

[22] Filed: Sep. 28, 1981

[51] Int. Cl.³ .............................................. F02M 21/04
[52] U.S. Cl. .................................. 123/478; 123/1 A; 123/527
[58] Field of Search ........... 123/1 A, 276 E, 478–494, 123/525, 527, 445, 446, 458, 462

[56] References Cited

U.S. PATENT DOCUMENTS

| 2,767,691 | 10/1956 | Mengelkamp et al. | 123/1 A |
| 4,048,964 | 9/1977 | Kissel | 123/478 X |
| 4,169,441 | 10/1979 | Hirano et al. | 123/489 X |
| 4,235,205 | 11/1980 | Fukui et al. | 123/478 X |

FOREIGN PATENT DOCUMENTS

| 2441732 | 7/1980 | France | 123/1 A |
| WO81/00282 | 2/1981 | PCT Int'l Appl. | |

Primary Examiner—Tony M. Argenbright
Attorney, Agent, or Firm—Markell Seitzman; Russel C. Wells

[57] ABSTRACT

A fuel injector and injection system for injecting liquified petroleum gas (LPG) into at least one air/fuel mixing chamber from a storage means that stores pressurized LPG in its liquid state. The fuel injector (including a body), adapted to receive pressurized LPG from the storage means and for selectively delivering the LPG to the air/fuel mixing chamber in its liquified state. The system including means for correcting the injector activation signal for pressure and density variations in the fuel.

41 Claims, 5 Drawing Figures

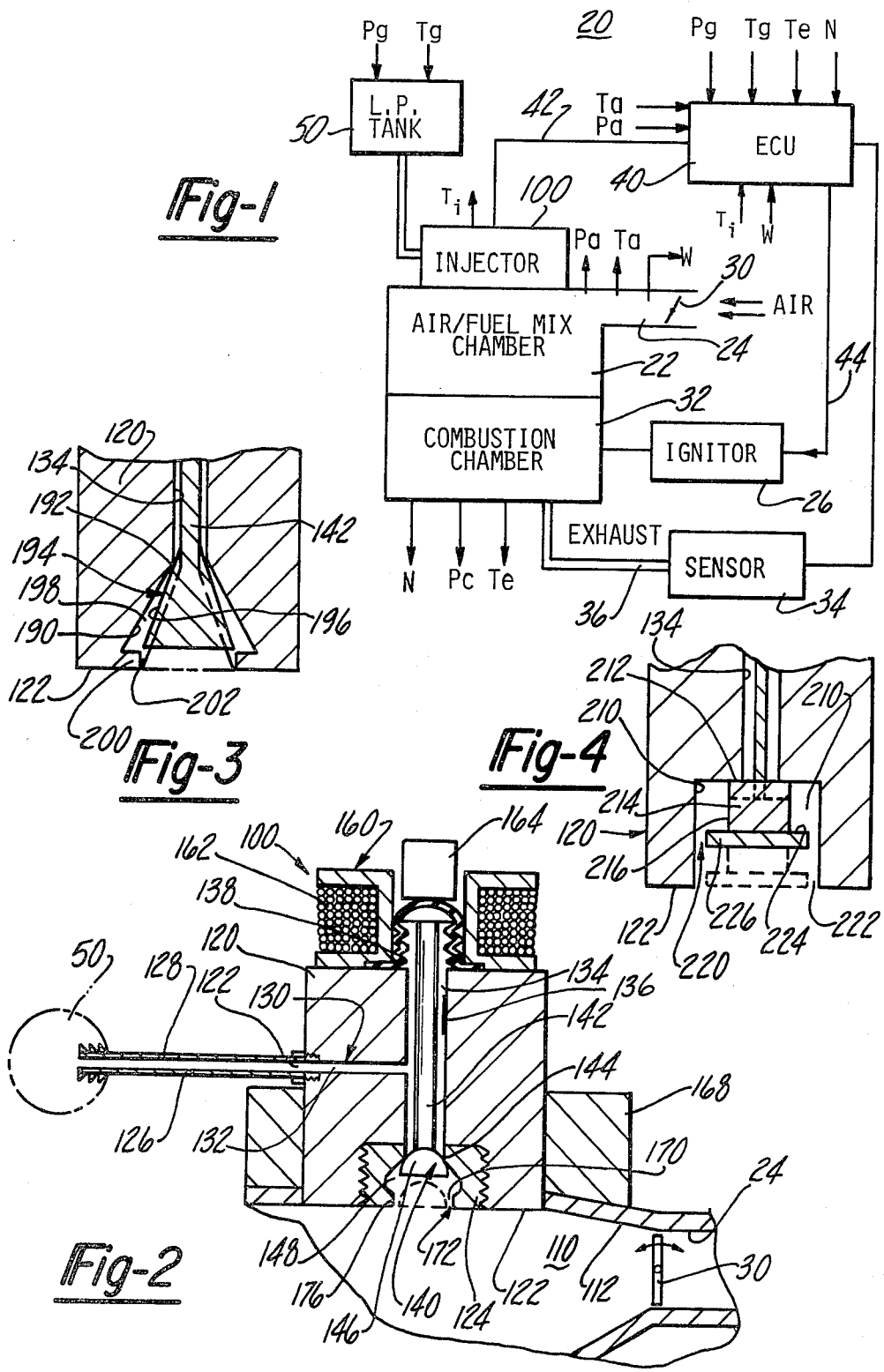

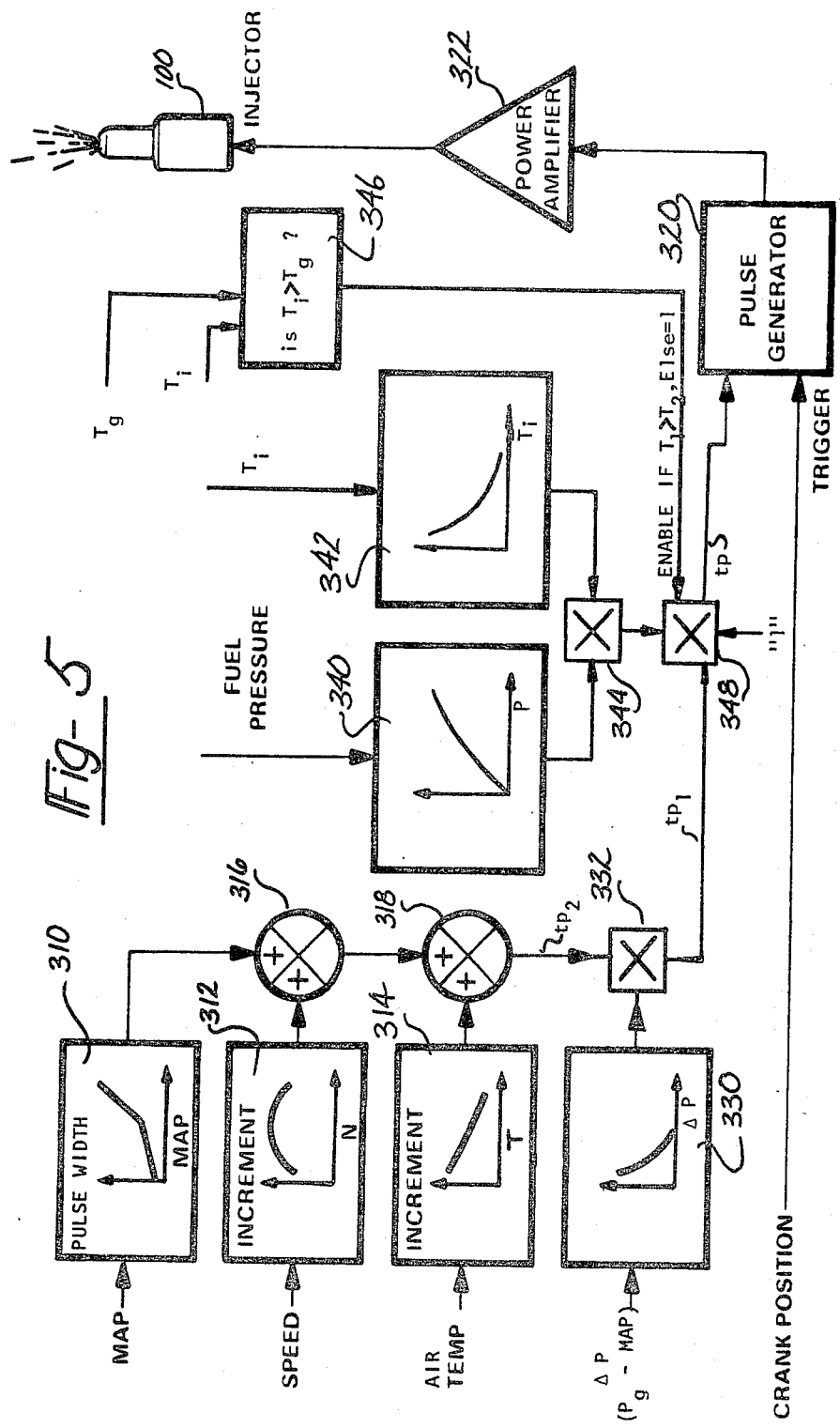

DIRECT LIQUID INJECTION OF LIQUID PETROLEUM GAS

BACKGROUND AND SUMMARY OF INVENTION

The invention relates generally to liquid petroleum gas (LPG) fuel injectors and injection systems for devices such as furnaces, water heaters and engines and specifically to a direct injection fuel system that eliminates the need for regulators, vaporizers, lock-out valves, carburetors, transfer pumps and the like and that injects LPG fuel in a liquified state into an air/fuel mixing chamber of such devices.

Liquid petroleum gas has been used in a variety of combustion systems such as stoves, furnaces, water heaters and internal combustion engines. The common feature of these various LPG combustion systems is the reduction of the LPG from a high pressure liquified state to a low pressure gasified state and to thereafter mix the low pressure previously vaporized gas with air. These systems require a sophisticated progression of components such as: solenoids, lock-off valves, pressure regulators, vaporizers and carburetors or mixers increasing the cost and lowering the reliability of the fuel system.

LPG is a mixture of light petroleum hydrocarbons and when stored under a moderate pressure reduces to a liquid and when released to the atmosphere at normal ambient temperatures rapidly vaporizes to a gas. This feature represents a significant difference in comparing LPG to other fuels such as gasoline, kerosene, alcohol and diesel fuel.

As mentioned above the basic components of existing LPG gasified carburetion systems include: a pressurized fuel tank from which the LPG passes in a liquified state through a filter and to a solenoid lock-off valve. The liquid fuel is fed from the lock-out valve into a pressure regulator-vaporizer which comprises a two or three stage regulator dropping the pressure of the LPG to nearly atmospheric pressure at which point it is reduced to a vapor. This characteristic requires the supplying of heat to the regulator-vaporizer to maintain the LPG in its vaporous state. The LPG vapor (gas) is fed to a carburetion device such as a carburetor or mixer where it is mixed with air.

An advantage of the present system as compared with the presently available LPG carburetion systems is the elimination of costly devices such as a carburetor, pressure regulator, vaporizer lock-out valve. In addition a further advantage of the present invention as compared to conventional gasoline or diesel systems is the elimination of a fuel or transfer pump to transport fuel from a storage tank to a fuel injector. A most important advantage of the present invention is providing means for correcting the activation signal to the fuel injector to compensate for pressure and density variations in the LPG fuel. A further advantage of the present invention is that it provides that the endothermic expansion of the liquid LPG to a vapor occur while the expanding fuel is mixing with the induced air. The power output of almost all fuel systems for internal combustion engines is that they are air limited. Consequently, if more air is introduced into the combustion chamber (engine) performance is enhanced. If the air that is introduced into the combustion chamber is cooled the extent of certain noxious exhaust emissions is lowered. By causing the endothermic expansion of the LPG to occur as described the induced air is cooled, made more dense and hence more air molecules are introduced into the combustion chamber yielding improved performance. Further lowering the temperature will decrease a spark ignited engine's tendency to pre-ignite and knock.

Accordingly, the present invention is directed to a fuel injection system for injecting liquified petroleum gas (LPG) into at least one air/fuel mixing chamber from a storage means such as a fuel tank, that stores pressurized LPG in its liquid state. In one embodiment, the fuel system includes injection means adapted to receive pressurized LPG from the storage means for selectively delivering the LPG to the air/fuel mixing chamber in its liquified state. The injection means, may include an electromagnetic fuel injector including first means for providing that the endothermic expansion of the LPG from its liquid to its vapor state occur at or beyond the lower extreme of the body. In another embodiment the fuel system includes means for compensating for fuel metering errors arising from pressure and density variations of the LPG fuel within the system.

Many other objects, features and advantages of the invention will be clear from the following detailed description of the drawings.

BRIEF DESCRIPTION OF THE DRAWING

In the drawings:

FIG. 1 is a block diagram illustrating the major components of a liquid LPG fuel injection system.

FIG. 2 illustrates a LPG liquid fuel injector.

FIG. 3 illustrates an alternate embodiment of a fuel injector.

FIG. 4 illustrates a further embodiment of a fuel injector.

FIG. 5 is a block diagram illustrating an alternate embodiment of the present invention.

DETAILED DESCRIPTION OF THE DRAWINGS

FIG. 1 illustrates a direct liquid LPG fuel injection, control, or management system comprising at least one fuel injector 100 that is adapted to inject liquified LPG into an air/fuel mixing chamber generally designated as 22. In the context of the present invention, fuel injector 100 can be a mechanically or an electromagnetically activated injector. The air/fuel mixing chamber 22 may include the intake manifold of a furnace or of an engine or may comprise one of a plurality of such chambers immediately adjacent each combustion chamber of the engine. The mixing chamber 22 is further connected through an induction passage 24 to the ambient environment. A throttling mechanism such as the throttle valve 30 may be movably disposed in the induction passage 24 and controlled in a known manner to permit air to enter the mixing chamber. It should be noted that in the present invention the injector 100 may be situated upstream or downstream of the throttling mechanisms. The mixing chamber is disposed adjacent to at least one combustion chamber 32. The injector 100 receives liquid LPG from an LPG storage or pressure tank 50. A fuel igniter 26 is positioned adjacent to or within each combustion chamber 32 for igniting the fuel.

Due to the fact that commercially available LPG has a variable and otherwise unknown constituency it may be desirable to incorporate within the system 20 an exhaust gas sensor 34 that is lodged within an exhaust gas conduit 36 extending from the combustion chamber. The exhaust gas sensor assists the system to compensate for LPG mixture variations and to operate at a determinable air/fuel ratio. The exhaust gas sensor generates a signal indicative of the constituency of the exhaust gases. The output signal or signals of the exhaust gas sensor is thereafter communicated to an electronic control unit (ECU) 40 of a known variety which generates an injection or activation signal on line 42 causing the injector 100 to open thus causing determinable quantities of LPG in a liquid state to be transferred from the LPG pressure tank 50 and introduced directly into the air/fuel mixing chamber 22. The ECU 40 further generates an ignition signal on line 44 to activate the fuel igniter 26. The signals generated by the ECU 40 are responsive to at least one operating parameter such as the pressure ($P_g$) or temperature ($T_g$) of the LPG within the tank 50, the temperature $T_a$, volumetric flow W, and pressure $P_a$ of the air passing through the induction passage 24, the temperature $T_c$, or pressure $P_c$, within a respective combustion chamber; speed of rotation N, of an engine, pressure (MAP) of the air/fuel mixing chamber 22 and in certain cases the temperature, $T_i$ and pressure $P_i$ of the LPG within the injector 100.

In operation LPG is stored in the pressure tank 50 at a pressure that is typically about 100-150 pounds (7 to 10 bars) and is directly connected to the injector 100 thereby eliminating the need for the complicated and expensive components used in the prior art such as regulators, vaporizers, lock-out valves, transfer pumps, etc. In response to the injection or activation signal received on line 42 the injector 100 will open therein causing the LPG in its liquid state to be injected directly into the air/fuel mixing chamber 22. Upon the opening of the injector 100, LPG in its liquid state is almost immediately flashed to a vapor, is mixed with and cools the incoming air. This mixture of vaporized LPG and air is communicated to the combustion chamber 32 and ignited. The exhaust gas sensor 34 such as an oxygen sensor may generate an output signal indicative of the completeness of combustion. The output of sensor 34 is utilized by the ECU 40 to vary the time of activation of the injector 100 in a known manner to vary the quantity of LPG fuel communicated to the mixing chamber 22 and hence to vary or to maintain the air/fuel ratio of the composite air/fuel mixture. Should the ECU 40 detect that there exists temperature and/or pressure differential between the injector 100 and the tank 50 the ECU 40 will modify the activation signal transmitted on line 42 as described below so that the quantity of fuel injected by the injector 100 is adjusted by an appropriate amount to compensate for the difference in the pressure and density of the LPG fuel resulting from these differentials.

Reference is now made to FIG. 5 which illustrates alternate embodiments of the invention which may be used to compensate for variations, in fuel density, within the system. The FIG. 5 generally relates to an embodiment of the invention that defines a system that compensates for variations in fuel pressure and fuel density as a function of both pressure and temperature differences. An alternate, and simplified, embodiment of the invention which corrects for variations in pressure is achieved by eliminating the temperature related correction terms contained in elements (340,342 etc.) of FIG. 5. In addition, it should be noted that the below described pressure compensation scheme is generally applicable to all fuel systems and not just applicable to fuel systems injecting high vapor pressure fuel such as LPG.

In a conventional synchronously-actuated gasoline fuel injection system such as described by Sutton, et al in U.S. Pat. No. 2,980,090, the regulation of the fuel quantity injected depends on the effective area of the injector orifice, the supply pressure and the length of time the injector is maintained in its open position. Put another way, the flow rate of fuel into the engine is proportioned to the effective injector orifice area, the supply pressure, and the product of engine speed and injector duty cycle.

Such systems generally use the injector duty cycle (pulse width) as a control input to generate an activation signal indicative of the injector open period. Typically the activation signal is a variable duration pulse width signal. The pulse width signal may be derived, in a known manner, using look-up tables stored in the ECU 40, to generate a nominal pulse width signal as a function of the absolute manifold pressure (MAP) as shown in block 310. The pulse width signal so generated can be modified by such parameters as engine speed and air temperature as generally indicated by the look-up tables of blocks 312 and 314 and the summing operations generally indicated as 316 and 318. The resulting pulse width signal is designated as $tp_2$.

The output of the summer 318 of a typical prior art system is connected (not shown) to a pulse generator such as the pulse generator 320 of the present invention. The output of the pulse generator 320 is applied to an injector through a drive or power amplification device, such as amplifier 322.

The accuracy of such prior systems, depends upon manufacturing tolerances to maintain consistency of the effective area of the injectors and constancy of the differential pressure drop across the injector orifice(s). If such systems are applied to a system using a high vapor pressure gas such as LPG (Propane or Butane) provisions must be taken to prevent or to compensate for vapor formation of the fuel within the injector 100, otherwise, incorrect amounts of fuel will be injected or metered into the engine. One approach to this problem is given in SAE paper No. SAE 670052 wherein a transfer pump is used to transport fuel from a fuel tank to an injector. The transfer pump is sized to have a capacity to maintain the supply pressure at a sufficiently high level such that the pressure of the fuel in the injector is always above its vapor pressure. If the supply pressure is not maintained as described above, vapor will form and since (below the critical point of the fluid) the vapor density is less than the liquid density metering errors will occur.

The present invention eliminates the need for the transfer pump and compensates for the metering errors due to pressure and density variations.

The errors due to pressure and density variations can be identified (and quantified) by considering Bernoulli's Theorem:

$$q = C_D A \sqrt{2g\gamma(\Delta P)} \qquad (1)$$

where q is the mass flow rate, $C_D$ is the discharge coefficient of the orifice, A is the area of the orifice, q is the acceleration of gravity, $\gamma$ is the fluid density, and $\Delta P$ is the pressure difference across the orifice. For convenience let $K1 = C_D A\sqrt{2} \ g$ since these elements are considered constant in the subsequent discussion. Bernoulli's Theorem can now be rewritten as equation 2.

$$q = K1 \sqrt{\gamma(\Delta P)} \quad (2)$$

It is the purpose of this invention to provide a control system which can correct for the aforementioned metering errors, allowing the elimination of any supply pump, thereby significantly simplifying the system.

It is well known that the vapor pressure of a pure liquid (or an azeotropic mixture of pure liquids) can be related to its temperature by the Clausius-Clapeyron equation as given by equation 3.

$$\log_e P = -\frac{\Delta H}{RT} + \text{constant} \quad (3)$$

where e signifies that natural or Napernian logarithms are to be used; ΔH is the molar heat of vaporization, R is the Universal Gas constant, and T is the absolute temperature of the liquid-gas interface. The Clausius-Clapeyron equation can be rearranged to give:

$$P = P_o \exp\left(-\frac{\Delta H}{R}\left[\frac{1}{T} - \frac{1}{T_o}\right]\right) \quad (4)$$

where exp again refers to the base of natural logarithms (=2,71828 ...), and subscript 'o' refers to a reference condition.

The vapor pressure of the fuel, and therefore the supply pressure (without a transfer or supply pump) will show substantial changes with changes in tank temperature. Equation 2 shows that the flow rate of fluid through the fixed orifice (172; 202; 222) of the injector 100 is directly proportional to the square root of the pressure difference across the orifice. By measuring the pressure differential across the fuel injector 100 pressure data is derived to modify (increase) the duty cycle of the injector to compensate for these supply pressure variations. One method of measuring this pressure differential is to monitor the fuel pressure upstream of the injector such as measuring the pressure ($T_g$) in the tank 50 and the pressure (MAP) in air/mixing chamber 22 or intake mainfold 110 of the engine. The pulse width signal, generally designated as $tp_2$, in FIG. 5, is thereafter altered in proportion to a factor such as the square root of this pressure difference. As illustrated in FIG. 5 the pressure difference is formulated within the block 330 and is then multiplied with the pulse width signal, $tp_2$, using the multiplier 332. Absent any other error correction factors the modified pulse width signal $tp_1$, may be applied directly to the pulse generator 320 to generate an overall control signal which will compensate for those metering errors arising from pressure variations.

Another problem which can be encountered in liquid-injection LPG fuel systems occurs when the injector 100 is at a higher temperature than the tank; in that case, vapor will be present at the injector, since the tank 50, containing most of the fuel, acts as a system pressure reservoir. If fuel elsewhere in the system (upstream of the injector 100) vaporizes, the additional space occupied by the vapor causes liquid fuel to be forced back toward the tank, causing some fuel vapor in the space above the liquid to condense to maintain equilibrium.

It is therefore another objective of this invention to provide an economical means for the detecting and for compensating for the change in fuel density because of the presence of vapor.

Temperature sensing elements are placed at both the injector 100 and the tank 50. Alternatively a differential temperature sensor such as a thermocouple and bridge network may be used. When there exists a temperature differential such that the injector temperature is higher than the tank, logic in the ECU 40 shifts the fuel calibration schedule of the system.

The fuel vapor density (at any constant pressure) is inversely proportional to its absolute temperature as shown by the following relationship $$\gamma = \frac{\gamma_o T_o}{P_o} \times \frac{P}{T_i} \quad (5)$$

where the symbols have the same meaning as previously defined.

It should be noted therefore that, with vapor present in the injector orifice, the supply pressure (established by tank temperature) affects the metering characteristic (described by equation 2) directly by causing a change in the pressure difference ΔP across the injector orifice, and also indirectly by its effect on density noted in equation 5. Both of these effects can be readily accounted for.

The absolute fuel pressure P, and absolute injector temperature $T_i$ are used to implement the density correction, as described below. This correction is in the form $K3\sqrt{P}/\sqrt{T_i}$ where K3 is a constant of proportionality. This correction can be implemented in two separate tables (blocks 340 and 342) which extract square roots and are then multiplied together in block 344 to form the correction factor. If the ECU 40 establishes the fact that the injector temperature is greater than that of the tank (block 346) the correction factor is multiplied with the pulse width signal $tp_1$ in multiplier 348 yielding the final pulse width signal tp which is thereafter applied to the pulse generator 320. If the above described temperature difference does not exist the signal $tp_1$ is applied without correction to the pulse generator 320.

It should be appreciated that the modifications to the pulse width signal $tp_2$ resulting from the pressure differential (block 330) or from the temperature differential (blocks 340 and 342) can be used separately or in concert with one another depending upon the desired system specifications.

Reference is now made to FIG. 2 which illustrates a preferred embodiment of the fuel injector 100. The fuel injector 100 is adapted to be received within an air/fuel mixing chamber such as the intake manifold 110 of a furnace, water heater or internal combustion engine. The injector 100 is preferably, but not necessarily, situated downstream of the throttle 30 which is movably lodged in an induction passage 24. The fuel injector comprises a body 120 that is adapted to receive pressurized LPG at a port 122. As illustrated in FIG. 2 the body 120 of the injector 100 is preferably mounted such that its lower portion or exit end 122 is flush with the interior wall 112 of the intake manifold. Alternatively the injector 100 may extend into the intake manifold. The port 122 is connected to and receives liquid LPG, under pressure, from the fuel storage tank 50 through a conduit 126. A heat pipe 128 of known material may be positioned in thermal contacting relation about the conduit 126. The heat pipe provides a means for temperature stabilizing the fuel injector 100 with the storage tank by appropriately utilizing the storage tank 50 as a heat sink or heat source.

The port 122 is connected to a valve means 140 through a conduit system 130. The conduit system includes a fluid passage 132 that is connected to a variable volume fuel storage chamber 133. In the embodiment of the invention herein illustrated the fuel storage chamber comprises an axially extending fuel passage 134 terminating at one end at a valve means 140. The valve means selectively opens and closes the fuel storage chamber for permitting fuel to exit therefrom. The fuel passage 134 further includes at its other end a bellows means that includes a bellows spring 138 that is attached to the body 120. The function of the bellows spring 138 is multifold; it biases the valve means 140 in a closed position due to its mechanical characteristics of springforce, and additionally provides an area for the pressure of the LPG in passage 134 to act against and thereby prevents the valve means 140 from opening prematurely. The bellows means further provides for the pressure balancing of the pressure forces applied to the valve means and associated plunger 142 such that the electromagnetic and/or mechanical forces needed to activate the injector 100 remain relatively constant. As illustrated in FIG. 2 the plunger 142 is reciprocatively and loosely situated within the fuel passage 134 and is connected at one end to the valve means 140 and at its other end to the interior of the bellows spring 138. While the preferred embodiment utilizes the bellows spring 138 to accomplish the above identified functions. The bellows means may equivalently include a flexible, non-energy storing bellows and a separate spring, or a pintle seal and spring arrangement or other similar means.

The valve means 140 may comprise a valve seat 144 that is fabricated as part of the lower portion of the body 120 and a closure element such as a ball 146 that is connected to the plunger 142. The dimensions of the closure elements are chosen to generally conform to the dimension of the valve seat to permit sealing therebetween. The body 120 further includes an elarged or stepped bore 148 that terminates at one end at the valve seat 142 and at its other end at the terminal or exit end 122 of the body 120. The bore 148 and valve seat 142 may be an integral part of the body 120 or formed within a washer-like member 124 that is attached to the body 120 as illustrated.

The fuel injector 100 further includes a means for moving the plunger 142 and valve means 140. One such means includes an electromagnet 160 having a coil 162 that is attached to the body 120 and positioned in surrounding relationship to the bellows spring. The electromagnet further includes an armature 164 that is responsive to the magnetic field produced by the coil 162 and is coupled to the bellows spring 138. Alternatively the bellows spring can be moved by a mechanical actuating device such as a cam and plunger (not shown).

As a result of the thermodynamic process resulting from injecting liquid LPG into the manifold 110 the temperature of the surrounding environment should drop. Consequently depending upon the extent of temperature drop, it may be desirable to incorporate within the present invention means for controlling the temperature of the fuel injector 100. A temperature controlling means is generally designated as 168 in FIG. 2. Examples of such means for controlling the temperature of the body of the fuel injector are to provide a heat exchanger by incorporating the injector 100 within the engine's water jacket (not shown) or by providing electric heating coils (not shown) in surrounding relationship to the body 120 or by incorporating the previously described heat pipe 128.

Additionally the temperature of the fuel injector can be controlled by designing the injector 100 to produce a pressure drop (to allow the liquid fuel to vaporize upon injection from the body 120) and to effectively locate the evaporation zone and resultant refrigeration beyond the fuel injector body 120.

In the preferred embodiment of the invention the body 120 partially envelops and extends below the valve seat 142. The interior dimension of the walls of the bore 148 are chosen to generally conform to the exterior contour of the closure element 146. In this manner, when the closing element is in its open position, as illustrated by the dotted lines in FIG. 2, the bore 148 and the closure element cooperate to define an annular fluid passage 170 for permitting the liquified LPG to flow out of the storage chamber or fuel passage 134. In those situations where it is desirable to monitor the temperature of the fuel within the injector a thermocouple, generally designated as 136, or similar device may be mounted in the passage 134. The cross-sectional area of the fluid passage 170 is generally chosen such that it does not present a restriction to fuel flow. Consequently passage 170 can be chosen to be equal to or slightly larger than the cross-sectional area of the fuel passage 134. Except, however, the area of the fuel outflow or exit orifice, generally designated as 172 of fluid passage 170, is chosen such that it represents a minimum area when compared to the cross-sectional area of the upstream fuel passages including the fluid passage 170 and the conduit system comprising the fluid passages 132 and 134.

In the open position the closure element 146 is maintained apart from the valve seat 142 and extends down into the bore 148. In this position the closure element 146 and bore 148 cooperate to establish and to restrict the area of the orifice 172 of the fluid passage 170. This is accomplished, by incorporating as part of the bore 148 a means for restricting the fluid passage 170 such as an inwardly directed circumferential shoulder 176 proximate the terminal or exit end 122 of the body 120. Alternatively, the restricting means may be incorporated as part of the closure element 146.

Reference is briefly made to FIGS. 3 and 4 which illustrate alternative embodiments of the present invention. FIG. 3 illustrates a partial section of the lower portion of the body 120. The body 120 includes the axially extending fuel passage 134 that terminates at a generally conically shaped bore 190, the transition therebetween defining a valve seat 192. A closure element such as a frustro-conical member 194 is linked to the plunger 142. The closure element comprises walls 196 that generally conform to the conical dimensions of the bore 190. In its open position, the walls 196 and bore 190 cooperate to define an annular fluid passage 198. The cross-sectional area of the fluid passage 198 in the open position may be constant or of gradually increasing dimension. The fluid passage 198 terminates at an annular orifice 202. A circumferential shoulder 200 restricts the exit area of the annular orifice 202 in a manner as previously described. A further embodiment of the invention requires the removal of the circumferential shoulder 200, thus permitting the walls 190 to terminate at the exit end 122. By not restricting the exit area of the annular orifice 202 this arrangement provides that the evaporation zone and resulting refrigeration occur within the injector and thereby cool it.

FIG. 4 illustrates a further embodiment of the invention comprising a stepped bore 210 linking the fluid or fuel passage 134 to the exit end 122 of the body 120. The transition between passage 134 and bore 210 defines a valve seat 212. The closure element comprises a member 214 having a generally cylindrical shape that is adapted to sealaby engage the valve seat 212. The walls 216 of the member 214 and of the bore 210 define a fluid passage 220 terminating at the annular orifice 222. The member 214 further includes restricting means, such as shoulder 224 for reducing the exit area of the orifice 222. The shoulder 224 may be an integral part of the member 214 or formed by a separate plate 226 attached thereto.

Returning to FIG. 2, upon receipt of an activation signal to the electromagnet 160 a magnetic force is created and attracts the armature 162 thereby compressing the bellows spring 138 which dislodges the valve means and causes the direct injection of liquid LPG into the intake manifold for mixture with and cooling the air stream therein. As the LPG exits from its corresponding exit orifice (172) of the injector it will initially remain in its liquid sttate. Due to the minimum area restriction imposed by the exit orifice, the liquid LPG will reduce to a vapor or gas state at a determinable distance from the injector body 120, thus, the location of endothermic expansion i.e. the evaporation zone of the LPG is maintained apart from the injector body 120. In addition, by introducing the LPG into the incoming air stream the location of endothermic expansion and the zone of cooling arising from this endothermic expansion is moved downstream due to the local air flow. By injecting fuel from the injector 100 in this manner the flow of heat from the injector into its surrounding environment is controlled during the time of fuel vaporization.

During non-injecting periods of time, that is, when activation or control signals are not applied to the electromagnet 160, the bellows spring 138 operates through the plunger 142 to maintain the valve means 140 in a closed condition and liquified LPG is received from the storage tank 50 through the fluid passage 126 and resides in the variable volume fuel storage chamber 134 in its liquid state.

Many changes and modifications in the above-described embodiments of the invention can of course be carried out without departing from the scope thereof. Accordingly, that scope is intended to be limited only by the scope of the appended claims.

We claim:

1. A fuel injection system for releasing liquified high vapor pressure fluids or fuel such as Propane and Butane into at least one air/fuel mixing chamber from a means for storing the fluid in a pressurized, liquid state comprising:
   electronic control unit responsive to at least one operating parameter of the system for generating an activation signal indicative of the amount of fluid to be released into the at least one air/fuel mixing chamber;
   injection means mounted proximate each at least one air/fuel mixing chamber for releasing quantities of the high vapor pressure fluid, into the at least one air/fuel mixing chamber in response to said activation signal;
   means for sensing a difference in density of the fuel within said injection means, as compared to the density of fuel upstream thereto, including correction means for generating a correction factor indicative of said difference;
   means for sensing the temperature difference between the fuel within said injection means and said storage means; and
   means for modifying said activation signal by said correction factor during those times when the temperature of the fuel within said injection means exceeds the temperature of the fuel within said storage means.

2. The system as defined in claim 1 further including:
   activation signal modifying means for modifying said activation signal by a factor indicative of the pressure difference across said injection means.

3. The system as recited in claim 2 wherein said modifying means includes means for generating said pressure difference factor in accordance with the difference between the pressure of the fuel within said storage means and the pressure within said at least one air/fuel mixing chamber.

4. The system as defined in claim 3 wherein said modifying means includes a multiplier that generates said modified activation signal in proportion to the product of said activation signal and said pressure difference factor.

5. The system as refined in claim 1 or 2 wherein said correction means generates said correction factor in proportion to the pressure of the fuel within said injection means and inversely proportional to the absolute temperature of the fuel within said injection means.

6. The system as recited in claim 5 wherein said injection means includes means for injecting said fluid into said at least one air/fuel mixing chamber in its liquid state.

7. The system as recited in claim 5 further including:
   heat pipe means mounted in thermal contacting relation between said injection means and said storage means for transferring thermal energy therebetween.

8. The system as recited in claim 6 further including:
   heat pipe means mounted in thermal contacting relation between said injection means and said storage means for transferring thermal energy therebetween.

9. A fuel injection system for releasing fluid or fuel into at least one air/fuel mixing chamber from a means for storing the fuel comprising:
   electronic control unit responsive to at least one operating parameter of the system for generating an activation signal indicative of the amount of fuel to be released into the at least one air/fuel mixing chamber;
   injection means mounted proximate each at least one air/fuel mixing chamber for releasing quantities of the fuel, into the at least one air/fuel mixing chamber in response to said activation signal;
   activation signal modifying means for modifying said activation signal by a factor indicative of the pressure difference across said injection means.

10. The system as recited in claim 9 wherein said modifying means includes means for generating said pressure difference factor in accordance with the difference between the pressure of the fuel within said storage means and the pressure within said at least one air/fuel mixing chamber.

11. The system as defined in claim 10 wherein said modifying means includes a multiplier that generates said modified activation signal in proportion to the product of said activation signal and said pressure difference factor.

12. The system as recited in claim 11 wherein said injection means includes means for injecting said fluid into said at least one air/fuel mixing chamber in its liquid state.

13. The system as recited in claim 12 further including:
heat pipe means mounted in thermal contacting relation between said injection means and said storage means for transferring thermal energy therebetween.

14. The system as recited in claim 11 further including:
heat pipe means mounted in thermal contacting relation between said injection means and said storage means for transferring thermal energy therebetween.

15. A fuel injection system for releasing liquified high vapor pressure fluids such as Propane and Butane into at least one air/fuel mixing chamber comprising:
electronic control unit responsive to at least one operating parameter of the system for generating an activation signal indicative of the amount of fluid to be released into the at least one air/fuel mixing chamber;
injection means mounted proximate each at least one air/fuel mixing chamber for releasing quantities of the high vapor pressure fluid, into the at least one air/fuel mixing chamber in response to said activation signal;
means for storing the fluid in a pressurized, liquid state;
means for communicating the fluid from said storage means to said injection means;
means for sensing the temperature of said storage means and said injection means and for generating temperature signals indicative thereof;
electronic means, including a portion of the electronic control unit responsive to said sensing means for modyfying the activation signal in proportion to temperature differential between said storage means and said injection means.

16. The system as recited in claim 14 wherein said injection means includes means for injecting said fluid into said at least one air/fuel mixing chamber in its liquid state.

17. A fuel injection system for injecting liquified petroleum gas (LPG) into at least one air/fuel mixing chamber, comprising:
injection means, including a body, adapted to receive pressurized liquified LPG and for selectively delivering the LPG, in its liquified state, to the air/fuel mixing chamber and including:
first means for providing that the endothermic expansion of the LPG from its liquid to its vapor state occur at or beyond the lower extreme of said body; and
conduit means for transporting the pressurized LPG from the storage means to said fuel injector means and
heat pipe means, mounted in thermal contacting relation to said conduit mans for stabilizing the temperature of said injection means and for transferring heat to or from said injection means.

18. The system as defined in claim 17 wherein said injection means further includes heating means for heating said body.

19. The system as defined in claim 18 wherein said heating means includes an electric coil wound in surrounding relation with said body.

20. The system as defined in claim 19 further including storage means, connected to said conduit means for providing a source of pressurized liquid LPG.

21. A liquid petroleum fuel injection system comprising:
at lease one air/fuel mixing chamber;
first means for introducing a determinable amount of air to said at least one air/fuel mixing chamber;
storage means for storing pressurized liquid petroleum gas in a liquified fuel state; and
fuel injector means adapted to receive said liquified fuel for opening and closing in response to activation signals applied thereto and for communicating determinable quantities of liquid petroleum gas in its liquid state to said at least one air/fuel mixing chamber, said fuel injector means including second means for reducing the pressure of said liquified fuel at the interface between said fuel injector means and said at least one air/fuel mixing chamber such that the fuel ejected into said at least one air/fuel mixing chamber, reduces from its liquid state to its gaseous state apart from said fuel injector means.

22. The system as defined in claim 22 further including combustion means situated downstream of said at least one air/fuel mixing chamber, including at least one combustion chamber for receiving at least a portion of the air/fuel mixture; said combustion means further including igniter means, one associated with each combustion chamber for igniting said portion of the air/fuel mixture.

23. The system as defined in claim 22 wherein said fuel injector means comprises an electromagnetic fuel injector.

24. The system as defined in claim 23 further including electronic control means, connected to said fuel injector means, for generating said activation signals in response to at least one parameter characterizing the operation of said combustion means or of said storage means.

25. The system as recited in claim 24 wherein said combustion means comprises:
conduit means for porting exhaust gases therefrom and wherein said system further includes an exhaust gas sensor for communicating a signal to said electronic control means, indicative of a particular constituent of the exhaust gas.

26. The system as recited in claim 25 wherein said exhaust gas sensor is an oxygen sensor.

27. The system as defined in claim 26 wherein said air/fuel mixing chamber comprises an intake manifold of an internal combustion engine having at least one combustion chamber.

28. The system as defined in claim 27 wherein said first means includes throttle means, situated upstream of said at least one fuel injector means for varying the amount of air entering said intake manifold.

29. A method comprising the steps of:
disposing means for injection liquid petroleum fuel in an air/fuel mixing chamber;
providing air to the air/fuel mixing chamber;

providing fuel having a high vapor pressure, in a liquid state to the fuel injection means;

activitating the fuel injection means for a determinable interval to cause the liquified fuel to exit therefrom and to thereafter combine with the air within the air/fuel mixing chamber;

generating a signal indicative of the temperature difference between the fuel within the fuel injector and the fuel situated upstream of the fuel injector; and incrementally modifying the duration of activation in proportion to such temperature difference.

30. The method as defined in claim 29 including the additional step of temperature stabilizing the fuel injection mean.

31. The method as defined in claim 30 wherein the step of temperature stabilizing includes heating the fuel injection means.

32. The method as defined in claim 31 wherein the step of energizing further includes:

controlling the amount of liquid fuel injected to maintain a predetermined air/fuel ratio.

33. A method of operating a fuel injection system for releasing liquified high vapor pressure fluids such as Propane and Butane into at least one air/fuel mixing chamber from a storage means the method comprising:

generating an activation signal indicative of the amount of fluid to be released into the at least one air/fuel mixing chamber;

sensing a difference in density of the fuel within said injection means, as compared to the density of fuel upstream thereto, including the step of generating a correction factor indicative of said difference;

sensing the temperature difference between the fuel within said injection means and said storage means;

modifying said activation signal by said correction factor during those times when the temperature of the fuel within said injection means exceeds the temperature of the fuel within said storage means; and releasing quantities of the high vapor pressure fluid into the at least one air/fuel mixing chamber in response to said activation signal.

34. The method as defined in claim 33 further including:

the step of modifying said activation signal by a factor indicative of the pressure difference across said injection means.

35. The method as recited in claim 34 wherein said step of modifying said activation signal includes generating said pressure difference factor in accordance with the difference between the pressure of the fuel within said storage means and the pressure within said at least one air/fuel mixing chamber.

36. The method as defined in claim 35 wherein said step of modifying further includes generating said modified activation signal in proportion to the product of said activation signal and said pressure difference factor.

37. The method as defined in claim 33 or 34 wherein said step of sensing the difference in density includes generating said correction factor in proportion to the pressure of the fuel within said injection means and inversely proportional to the absolute temperature of the fuel within said injection means.

38. A method of operating a fuel injection system for releasing fuel or fluid having a high vapor pressure into at least one air/fuel mixing chamber from a storage means, the method comprising:

generating an activation signal indicative of the amount of fluid to be released into at least one air/fuel mixing chamber;

modifying said activation signal by a factor indicative of the pressure difference across said injection means; and releasing quantities of the high vapor pressure fluid, into at least one air/fuel mixing chamber in response to said activation signal.

39. The method as recited in claim 38 wherein the step of modifying includes generating said pressure difference factor in accordance with the difference between the pressure of the fuel within said storage means and the pressure within said at least one air/fuel mixing chamber.

40. The method as defined in claim 39 wherein the step of modifying means further includes generating said modified activation signal in proportion to the product of said activation signal and said pressure difference factor.

41. The method as recited in claim 40 further including:

transferring thermal energy between said injection means and said storage means.

* * * * *